United States Patent
Gallagher et al.

(10) Patent No.: US 11,113,126 B2
(45) Date of Patent: Sep. 7, 2021

(54) VERIFYING TRANSFER OF DETECTED SENSITIVE DATA

(71) Applicant: INTERNATIONAL BUSINESS MACHINES CORPORATION, Armonk, NY (US)

(72) Inventors: Aiden J. Gallagher, Winchester (GB); Emma J. Dawson, Eastleigh (GB); Katie C. Higgs, Bexley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/270,210

(22) Filed: Feb. 7, 2019

(65) Prior Publication Data

US 2020/0257576 A1 Aug. 13, 2020

(51) Int. Cl.
  *G06F 3/048* (2013.01)
  *G06F 9/54* (2006.01)
  *G06F 3/0482* (2013.01)
  *G06F 9/451* (2018.01)
  *G06F 3/0484* (2013.01)
  *G06F 40/14* (2020.01)

(52) U.S. Cl.
  CPC .......... *G06F 9/543* (2013.01); *G06F 3/0482* (2013.01); *G06F 3/0484* (2013.01); *G06F 9/451* (2018.02); *G06F 40/14* (2020.01)

(58) Field of Classification Search
  CPC .... G06F 21/6245; G06F 21/31; G06F 21/554; G06F 21/6254; G06F 40/174
  See application file for complete search history.

(56) References Cited

U.S. PATENT DOCUMENTS

| | | | |
|---|---|---|---|
| 7,908,564 B2 | 3/2011 | Hara et al. | |
| 8,321,958 B1* | 11/2012 | Fleming | G06F 16/9535 726/29 |
| 8,429,551 B2* | 4/2013 | Kim | G06F 16/9562 715/770 |
| 8,448,260 B1* | 5/2013 | Hansen | G06F 21/62 726/27 |
| 9,305,174 B2 | 4/2016 | Hansen | |
| 9,703,763 B1* | 7/2017 | Zemach | G06F 40/169 |
| 2005/0015379 A1* | 1/2005 | Aureglia | G06F 40/18 |

(Continued)

OTHER PUBLICATIONS

Brinkmann, "Paste Passwords into Blocked Form Fields on the Internet," gHacks Technology News, Jul. 26, 2014, p. 1-3, https://www.ghacks.net/2014/07/26/paste-passwords-blocked-form-fields-internet/, Accessed on Feb. 6, 2019.

(Continued)

*Primary Examiner* — Linh K Pham
(74) *Attorney, Agent, or Firm* — Rakesh Roy

(57) ABSTRACT

A method, computer system, and a computer program product for verified data transfer is provided. The present invention may include determining a first data type of a copy field including a copied data. The present invention may then include determining a second data type of a paste field intended for receiving the copied data. The present invention may further include, in response to identifying a mismatch between the first determined data type of the copy field including the copied data and the second determined data type of the paste field, preventing an input of the copied data into the paste field.

17 Claims, 7 Drawing Sheets

(56) References Cited

U.S. PATENT DOCUMENTS

| | | | | |
|---|---|---|---|---|
| 2007/0074133 | A1* | 3/2007 | Hara | G06F 3/0481 715/853 |
| 2008/0005751 | A1* | 1/2008 | Chandra | G06F 16/986 719/328 |
| 2008/0201656 | A1* | 8/2008 | Kim | G06F 40/166 715/770 |
| 2010/0058176 | A1* | 3/2010 | Carro | G06F 40/166 715/256 |
| 2011/0314446 | A1* | 12/2011 | Esbensen | G06F 40/166 717/110 |
| 2014/0304839 | A1* | 10/2014 | Hansen | G06F 21/6209 726/29 |
| 2015/0067513 | A1* | 3/2015 | Zambetti | G06F 3/0488 715/716 |
| 2015/0143534 | A1* | 5/2015 | Bowles | G06F 21/105 726/26 |
| 2016/0342997 | A1* | 11/2016 | De Tella | G06Q 20/40975 |
| 2017/0242983 | A1* | 8/2017 | Adams | G06F 21/10 |
| 2018/0053015 | A1 | 2/2018 | Sarin et al. | |
| 2018/0113846 | A1* | 4/2018 | Le Bescond de Coatpont | G06F 40/166 |
| 2018/0113849 | A1* | 4/2018 | Jindal | G06F 40/174 |
| 2018/0248698 | A1* | 8/2018 | Kominar | G06F 21/45 |
| 2019/0213249 | A1* | 7/2019 | Kistler | G06F 16/3344 |
| 2019/0347116 | A1* | 11/2019 | Horiuchi | G06F 16/90344 |

OTHER PUBLICATIONS

Mell et al., "The NIST Definition of Cloud Computing," National Institute of Standards and Technology, Sep. 2011, p. 1-3, Special Publication 800-145.

Sacha, "Let Them Paste Passwords," National Cyber Security Centre Blog, Jan. 12, 2017, p. 1-14, https://www.ncsc.gov.uk/blog-post/let-them-paste-passwords, Accessed on Feb. 6, 2019.

* cited by examiner

VERIFYING TRANSFER OF DETECTED SENSITIVE DATA

BACKGROUND

The present invention relates generally to the field of computing, and more particularly to data security.

In user-computer interactions, cut, copy, and paste commands are implemented to transfer text or other data from a source location of a user interface to a destination location of the user interface. Users often implement these commands to automatically transfer a text from a source location to a destination location in order to bypass the tedious and error prone task of manually typing the text into the destination location. For example, being able to paste a password into a password destination from a password source brings security benefits since copying and pasting allows users to implement distinct, secure passwords across different applications using the copy and paste command, rather than a single, less secure password that may be easier to remember and manually type. However, preventing users from inadvertently pasting passwords and other sensitive data (e.g., financial information) from a source location to an unintended destination may be beneficial.

SUMMARY

Embodiments of the present invention disclose a method, computer system, and a computer program product for verified data transfer. The present invention may include determining a first data type of a copy field including a copied data. The present invention may then include determining a second data type of a paste field intended for receiving the copied data. The present invention may further include, in response to identifying a mismatch between the first determined data type of the copy field including the copied data and the second determined data type of the paste field, preventing an input of the copied data into the paste field.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
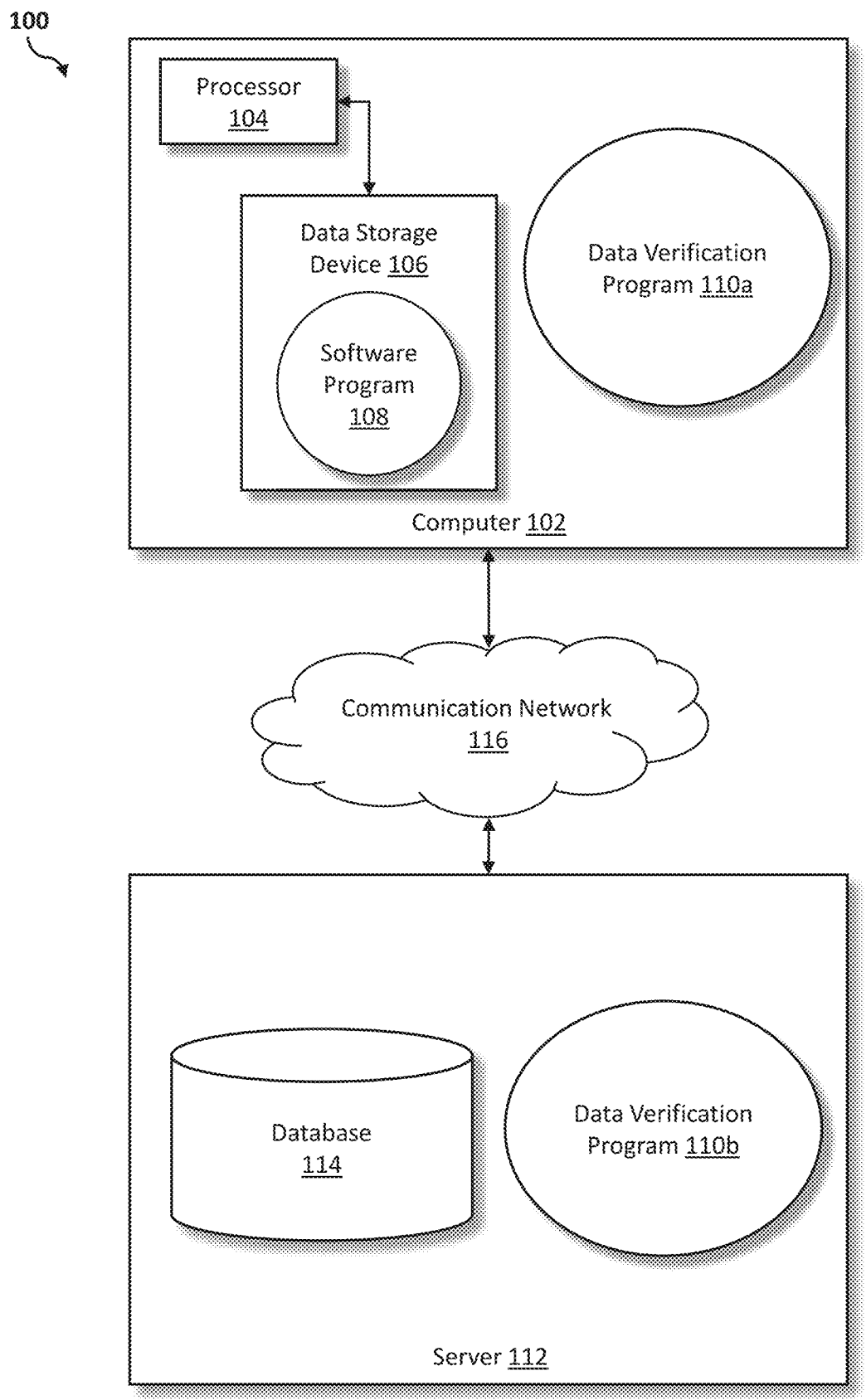
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for verifying a transfer of detected sensitive data from a source location to a destination location. As such, the present embodiment has the capacity to improve the technical field of data security by performing a pre-transfer determination of a copy field and a paste field in order to verify that a copied data included in the copy field is pasted into a matching paste field and to prevent transferring potentially sensitive data into an unintended paste field.

More specifically, a data verification program may inspect a source code corresponding to the copy field including the copied data (e.g., copied text) and may inspect a source code corresponding to the paste field intended for receiving the copied data. Then, the data verification program may determine a data type of the copy field and a data type of the paste field based on one or more tags, attributes, and elements included in the respective source codes associated with the copied data and the paste field. Next, the data verification program may compare the copy field and the paste field. Thereafter, if a mismatch is detected between the data type of the copy field and the data type of the paste field, the data verification program may alert the user about pasting potentially sensitive data in a wrong paste field.

As described previously, in user-computer interactions, cut, copy, and paste commands are implemented to transfer text or other data from a source location of a user to automatically transfer a text from a source location to a destination location in order to bypass the tedious and error prone task of manually typing the text into the destination location. For example, being able to paste a password into a password destination from a password source brings security benefits since copying and pasting allows a user to implement distinct, secure passwords across different applications using the copy and paste command, rather than a single, less secure password that may be easier to remember and manually type. At the same time, preventing users from inadvertently pasting passwords and other sensitive data (e.g., financial information) from a source location to an unintended destination may be beneficial.

For example, instances exist in which a user may forget what data is stored in a clipboard of a user device and may accidentally paste sensitive data on a display for viewing by other unauthorized users within proximity of the user device. Further, a website host requesting information from the user via a web form may gain unauthorized access to potentially sensitive data if the web form is submitted with the potentially sensitive data included in plain text (e.g., a password entered into an e-mail field may be viewed in plain text).

Existing solutions to the issue of pasting potentially sensitive data into unintended paste fields are directed towards completely blocking the copy and paste functions for certain fields, such as password input fields (e.g., some web pages implement source code "onpaste="return false""). However, as noted above, there are security benefits associated with allowing users to copy and paste secure, distinct passwords across various applications. In addition, there are existing workarounds that can temporarily overwrite the blocking of the copy and paste functions. Notwithstanding, none of the existing solutions enable pasting copied data from a copy field to a paste field after verifying a match between the copy field and the paste field.

Therefore, it may be advantageous to, among other things, provide a way to perform a check and comparison of a data type associated with a copy field and a data type associated with a paste field in order to enable the pasting of a copied data from the copy field to the paste field after verifying a match between the data type of the copy field and the data type of the paste field. In addition, it may be advantageous to, among other things, provide a way to prevent potentially sensitive data from being inadvertently displayed in an incorrect paste field within a web page or from being inadvertently submitted into a web form.

According to at least one embodiment, a data verification program may be implemented as an application, Internet web browser utility (e.g., browser extension, browser plug-in), application programming interface (API), or another similar tool running on a user device. The data verification program may be initiated when a user copies a text from a source location, such as a web page (e.g., website, web application). The data verification program may check the source code (e.g., field tags, attributes, elements) from the web page associated with the copied text to determine a data type of the copied text (e.g., password, e-mail). Then, the data verification program may record the copied text to a clipboard with an associated context (e.g., password) based on the data type of the copied text. Thereafter, if the user attempts to paste the copied text into a destination location, such as a paste field in another web page, the data verification program may check the source code (e.g., field tags, attributes, elements) from the web page associated with the paste field to determine a data type of the paste field (e.g., password, e-mail). If the data type of the paste field matches the data type of the copied text, the data verification program may enable the copied text to be pasted into the paste field. If the data type of the paste field does not match the data type of the copied text, the data verification program may transmit an alert to the user device to warn the user about the mismatch between the copied text and the paste field.

According to at least one embodiment, a data verification program may be universally compatible to detect a copied data across a variety of applications running on the user device (e.g., websites, web pages, web applications). In another embodiment, the data verification program may view or inspect the hypertext markup language (HTML) code (e.g., HTML source code) to determine if the copied data is potentially sensitive data (e.g., password) or just generic data based on indicators (e.g., tags, attributes, elements) included in the HTML source code of the web page. In one embodiment, the data verification program may localize an individual source code associated with the copied data located anywhere in a page source (e.g., HTML document) of the web page. Thereafter, the data verification program may analyze the localized individual source code to determine the data type of the copied data without having to process the HTML source code of the entire web page.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a data verification program 110a. The networked computer environment 100 may also include a server 112 that is enabled to run a data verification program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the data verification program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the data verification program 110a, 110b (respectively) to verify transfer of a detected sensitive data from a source location to a destination location. The data verification method is explained in more detail below with respect to FIGS. 2 to 4.

Figure 2:
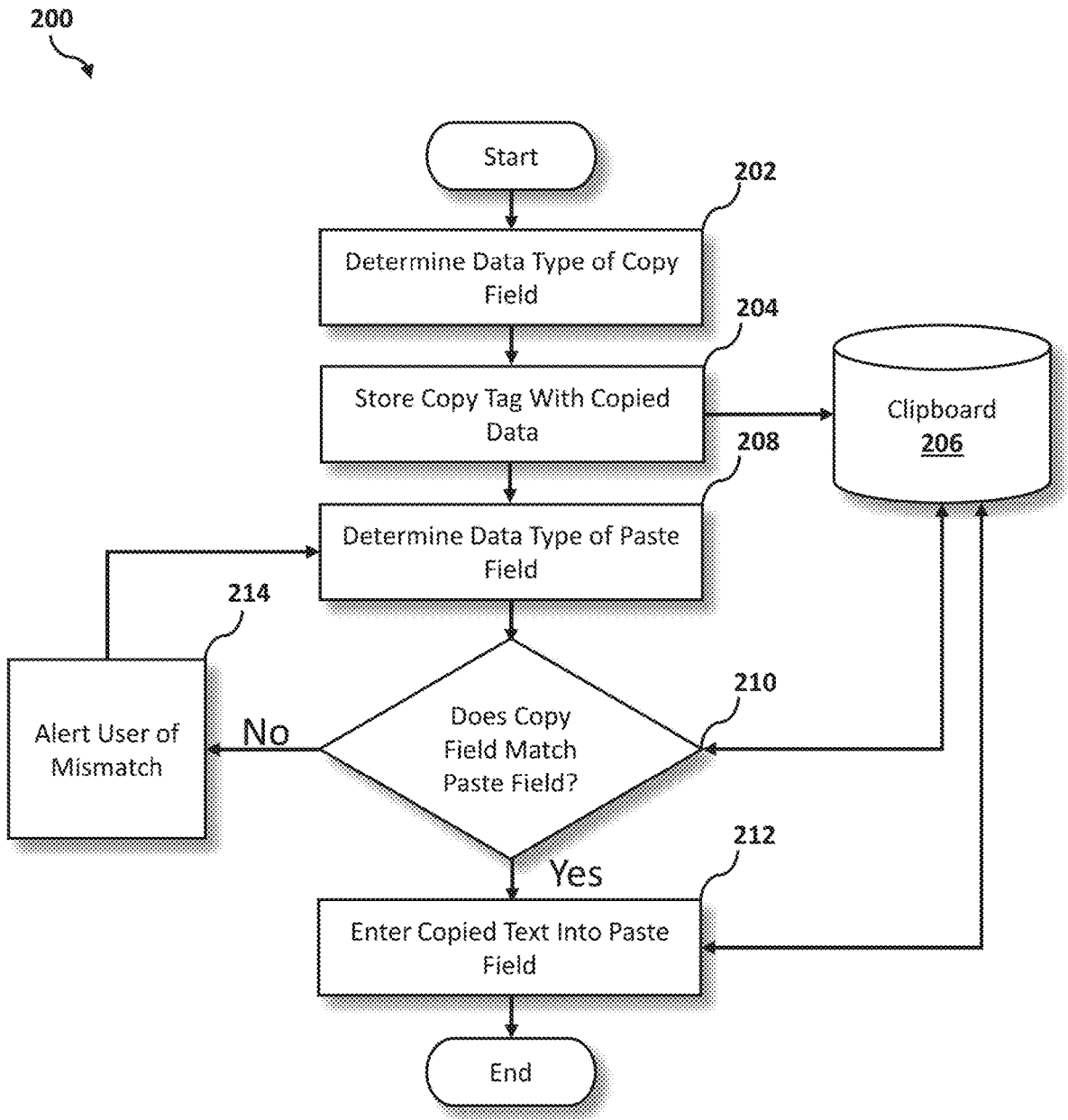
FIG. 2 is an operational flowchart illustrating a data transfer process for verifying transfer of detected sensitive information according to at least one embodiment.

Referring now to FIG. 2, an operational flowchart illustrating the exemplary data transfer process 200 for verifying transfer of detected sensitive information used by the data verification program 110a and 110b according to at least one embodiment is depicted.

At 202, a data type of a copy field is determined. A data verification program 110a, 110b may be implemented as an application, an Internet web browser utility (e.g., web browser extension, web browser plug-in), API, or another similar tool running on the user device. The data verification program 110a, 110b running on the user device (e.g., client computer 102) may be initiated in response to the user device executing a copy function for copying a data (e.g., a copied text). In one embodiment, the data verification program 110a, 110b may monitor user interactions across one or more applications running on the user device to detect a copy command received from the user via the user device (e.g., via keyboard input or pointer input). When the copy command is detected, the data verification program 110a, 110b may access or view one or more source codes (e.g., HTML source code) for the application in which the copy command was detected in order to determine the data type of a copy field including a copied data (e.g., the copied text).

According to one embodiment, the data verification program 110a, 110b may detect the user device executing the copy function within a web browser (e.g., text copied from a web page of a web site) running on the user device. The data verification program 110a, 110b may communicate (e.g., via communication network 116) from the user device to a server or web server (e.g., server 112) hosting the web site associated with the copied text and may include in the communication a request to view the HTML source codes corresponding to the web page including the copied text. In response, the data verification program 110a, 110b may receive (e.g., via communication network 116) from the web server (e.g., server 112), a page source (e.g., HTML document) including the requested HTML source codes.

The page source received by the data verification program 110a, 110b may include HTML source codes comprising one or more tags and attributes configured to construct the associated web page. In a syntax of the HTML source code, a tag may indicate an element configured to describe a structure and one or more contents of the web page and an attribute may define or modify a property of the element. For example, an "<input>" tag may represent an "<input>" element (e.g., input field) and a "type" attribute may define an input type of the "<input>" element (e.g., password input field).

According to one embodiment, the data verification program 110a, 110b may read through the HTML source code in the page source to identify a code snippet in the HTML source code corresponding the copy field including the copied text. According to another embodiment, the data verification program 110a, 110b may communicate (e.g., via communication network 116) with the web server (e.g., server 112) and include a targeted request (e.g., request indicating the copy field) for the code snippet corresponding to the copy field including the copied text. In response, the web server (e.g., server 112) may return (e.g., via communication network 116) the page source to the data verification program 110a, 110b with the requested code snippet localized within the page source (e.g., via hyperlink to the localized code snippet). Accordingly, the data verification program 110a, 110b may localize the requested code snippet anywhere in the page source without having to process all of the HTML code included in the page source.

Thereafter, the data verification program 110a, 110b may analyze and process the syntax of the code snippet to determine the data type of the copy field including the copied text. According to at least one embodiment, the data verification program 110a, 110b may determine the data type of the copy field based on processing a value or description indicated by one or more attributes of the elements in the code snippet. In one embodiment, the data verification program 110a, 110b may determine the data type of the copy field based on the value indicated by a "type" attribute, a "name" attribute, a "class" attribute, a "for" attribute, and/or any other suitable attribute (e.g., an "id" attribute) included in the code snippet. In another embodiment, the data verification program 110a, 110b may rely on a combination of elements and attributes to determine the data type of the copy field including the copied text.

In one example, the data verification program 110a 110b is implemented as a web browser plug-in on a user laptop. A user interacts with the web browser and enters a copy command via a keyboard of the user laptop to prompt the user laptop to perform a copy function of a text "J0hnsP@ssw0rd" from a web page A displayed via the web browser. The data verification program 110a, 110b is initiated in response to detecting the copy command received to the user laptop. The data verification program 110a, 110b transmits the targeted request (via communication network 116), indicating the copy field, to the web server (e.g., server 112) hosting the web page A to retrieve the code snippet of the HTML source code associated with of the copy field. In response, the web server returns to the data verification program 110a, 110b (via communication network 116), the page source for the web page A including a hyperlink to the requested code snippet. The data verification program 110a, 110b implements the hyperlink and localizes the code snippet "<input type="password" name="pwd">" of the HTML source code associated with the copy field. Thereafter, the data verification program 110a, 110b analyzes the syntax of the code snippet and determines, based on the "type" attribute and the "name" attribute, that the data type of the copy field including the copied text "J0hnsP@ssw0rd" is a password data type.

Then, at 204, a copy tag is stored with the copied data (e.g., copied text). After the copy command is received by the user device, the user device may store the copied text into a clipboard 206 of the user device. In one embodiment, the clipboard 206 may be implemented as a short-term data storage (e.g., in a memory component) of the user device. In another embodiment, the clipboard 206 may be implemented in the data storage device 106 of the user device. The clipboard 206 may store data (e.g., text, image, video, audio) that has been copied or cut (e.g., in response to the copy command or a cut command received by the user device) from a variety of sources such as, text documents, e-mails, web pages, spreadsheets, or other data structures. Thereafter, data stored in the clipboard 206 may be pasted or inserted into a user selected destination (e.g., paste field) in response to receiving a paste command to the user device.

According to one embodiment, the clipboard 206 may store the copied text along with a copy tag (e.g., a proxy of the data type of the copy field) indicating the context (e.g., password, e-mail) of the copied text. The data verification program 110a, 110b may designate or assign the copy tag based on the data type of the copied text determined at 202. The data verification program 110a, 110b may access the clipboard 206 and record the copy tag assigned to the copied text.

In one embodiment, the data verification program 110a, 110b may assign "password data" as the copy tag for the copied text based on determining (e.g., from code snippet "<input type="password" name="pwd">") a password data type at 202. In another embodiment, the data verification program 110a, 110b may assign "e-mail data" as the copy tag for the copied text based on determining (e.g., from code snippet "<input type="email" id="ap_email">") an e-mail data type at 202. In another embodiment, the data verification program 110a, 110b may assign "bank account data" as the copy tag for the copied text based on determining (e.g., from code snippet "<label for="account-number">Account Number</label>") a financial account data type at 202.

Similarly, the data verification program 110a, 110b may determine the copied text to be any potentially sensitive data type at 202 and may then assign a corresponding descriptive label as the copy tag of the copied text in the clipboard 206.

According to another embodiment, the data verification program 110a, 110b may determine the copied text to be a generic data type (e.g., does not disclose sensitive information) at 202 (e.g., from code snippet "<input type="text" name="fname">") and may then assign "generic data" as the copy tag of the copied text in the clipboard 206.

Thereafter, the data verification program 110a, 110b may transmit the copy tag (e.g., via the operating system, communication network 116) to the clipboard 206 for storage with the corresponding copied text (e.g., in a "copied text/copy tag" table).

Continuing with the previous example, the data verification program 110a, 110b determines that the copy field including the copied text "J0hnsP@ssw0rd" is defined by a password data type at 202. Accordingly, the data verification program 110a, 110b assigns "password data" as the copy tag of the copied text. Thereafter, the data verification program 110a, 110b transmits, via communication network 116, the copy tag "password data" for storage with the corresponding copied text "J0hnsP@ssw0rd."

Then, at 208, a data type of a paste field is determined. The data verification program 110a, 110b may monitor user interactions across one or more applications running on the user device to detect a paste command received from the user via the user device (e.g., via keyboard input or pointer input). When the paste command is detected, the data verification program 110a, 110b may access or view one or more source codes (e.g., HTML source code) for the application in which the paste command was detected in order to determine the data type of the paste field.

The data verification program 110a, 110b may execute steps similar to those described at 202 to determine the data type of the paste field. According to one embodiment, the data verification program 110a, 110b may detect the user device executing a paste function within a web browser (e.g., pasting text into a paste field in a web page of a web site) running on the user device. The data verification program 110a, 110b may communicate (e.g., via communication network 116) from the user device to the web server (e.g., server 112) hosting the web site associated with the paste field and may include in the communication a request to view the HTML source codes corresponding to the web page including the paste field. In response, the data verification program 110a, 110b may receive (e.g., via communication network 116) from the web server (e.g., server 112), a page source (e.g., HTML document) including the requested HTML source codes.

According to one embodiment, the data verification program 110a, 110b may read through the HTML source code in the page source to identify the code snippet in the HTML source code corresponding the paste field. According to another embodiment, the data verification program 110a, 110b may communicate (e.g., via communication network 116) with the web server (e.g., server 112) and include a targeted request (e.g., request indicating the paste field) for the code snippet corresponding to the paste field. In response, the web server (e.g., server 112) may return (e.g., via communication network 116) the page source to the data verification program 110a, 110b with the requested code snippet localized within the page source (e.g., via hyperlink to the code snippet). Accordingly, the data verification program 110a, 110b may localize the requested code snippet anywhere in the page source without having to process the HTML code included in the page source.

Thereafter, the data verification program 110a, 110b may analyze and process the syntax of the code snippet to determine the data type of the paste field. According to at least one embodiment, the data verification program 110a, 110b may determine the data type of the paste field based on processing a value or description indicated by one or more attributes of the elements in the code snippet. In one embodiment, the data verification program 110a, 110b may determine the data type of the paste field based on the value indicated by a "type" attribute, a "name" attribute, a "class" attribute, a "for" attribute, and/or any other suitable attribute (e.g., an "id" attribute) included in the code snippet. In another embodiment, the data verification program 110a, 110b may rely on a combination of elements and attributes to determine the data type of the paste field.

Continuing with the previous example, the user interacts with a banking website via the web browser running on the user laptop. The user enters the paste command via the user laptop keyboard to instruct the user laptop to paste the copied text "J0hnsP@ssw0rd" from the clipboard 206 to the paste field in a login page of the banking website. The data verification program 110a, 110b transmits the targeted request (via communication network 116), indicating the paste field, to the web server (e.g., server 112) hosting the banking website to retrieve the code snippet of the HTML source code associated with the paste field. In response, the web server returns to the data verification program 110a, 110b (via communication network 116), the page source for the login page of the banking web site including a hyperlink to the requested code snippet. The data verification program 110a, 110b implements the hyperlink and localizes the code snippet "<input type="password" id="pass" name="password" minlength="8" required>" of the HTML source code associated with the paste field. Thereafter, the data verification program 110a, 110b analyzes the syntax of the code snippet and determines, based on the "type" attribute and the "name" attribute, that the data type of the paste field is a password data type.

Then, at 210, an inquiry is made to determine if the copy field matches the paste field. In one embodiment, the data verification program 110a, 110b may perform the comparison between the copy field and the paste field prior to transferring the copied text to the paste field, to ensure that potentially sensitive data (e.g., a password) in the copy field is not inadvertently entered into the wrong paste field.

When comparing the copy field against the paste field, the data verification program 110a, 110b may normalize non-essential variations (e.g., syntax variations in the source code that do not impact the data type) in the code snippet of the copy field and the code snippet of the paste field and instead rely on a comparison between the data type of the copy field (e.g., determined at 202) and the data type of the paste field (e.g., determined at 208). In one embodiment, the code snippet of the copy field may include "password" as the "for" attribute of a "<label>" element and the code snippet of the paste field may include "user passphrase" as the "for" attribute of the "<label>" element. Notwithstanding the variations in the respective "<label>" elements of the copy field and the paste field, the data verification program 110a, 110b may infer that the data type of the copy field and the data type of the paste field both indicate a password data type.

In one embodiment, the data verification program 110a, 110b may determine the data type of the copy field based on the copy tag recorded with the corresponding copied text in the clipboard 206 (e.g., at 204). The data verification program 110a, 110b may communicate (e.g., via communication network 116) with the clipboard 206 to identify the copied text that is instructed (e.g., via paste command from user) to be pasted into the paste field and read the copy tag assigned to the copied text. Thereafter, the data verification program 110a, 110b may compare the copy tag of the copied text against the data type of the paste field (e.g., determined at 208) to determine a relationship between the copy field and the paste field.

If the data verification program 110a, 110b determines that the copy field matches the paste field at 210, the copied text is entered into the paste field at 212. The data verification program 110a, 110b may determine that the copy field matches the paste field if the copy tag (e.g., password data) of the copied text matches the data type (e.g., password data type) of the paste field. After the data verification program 110a, 110b acknowledges the match, the data verification program 110a, 110b may transmit a signal (e.g., via communication network 116) to the user device to instruct the user device to complete the paste function. Thereafter, the user device may paste the copied text from the clipboard 206 into the paste field.

According to at least one embodiment, the data verification program 110a, 110b may also determine that the copy field matches the paste field at 210 if the copy field includes the generic data type. Specifically, if the data verification program 110a, 110b communicates (e.g., via communication network 116) with the clipboard 206 to identify the copied text that is instructed (e.g., via paste command from user) to be pasted into the paste field and reads "generic data" as the copy tag assigned to the copied text, the data verification program 110a, 110b may acknowledge that the copied text may safely be entered into the paste field. Accordingly, the data verification program 110a, 110b may transmit the signal (e.g., via communication network 116) to the user device to instruct the user device to complete the paste function. In response, the user device may paste the copied text from the clipboard 206 into the paste field.

Continuing with the previous example, after the data verification program 110a, 110b determines that the data type of the paste field in the login page of the banking website is the password data type, the data verification program 110a, 110b communicates, via communication network 116, with the clipboard 206 to identify the copied text "J0hnsP@ssw0rd" that is instructed, via the paste command from the user laptop keyboard, to be entered into the paste field. Then, the data verification program 110a, 110b reads password data as the copy tag assigned to the copied text "J0hnsP@ssw0rd" stored in the clipboard 206. Next, the data verification program 110a, 110b compares the copy tag "password data" of the copied text "J0hnsP@ssw0rd" against the password data type of the paste field and determines a match between the copy field and the paste field. Accordingly, the data verification program 110a, 110b transmits a signal, via communication network 116, to the user laptop to instruct the user laptop to complete the paste function. In response, the user laptop retrieves the copied text "J0hnsP@ssw0rd" from the clipboard 206 and enters the copied text "J0hnsP@ssw0rd" into the paste field in the login page of the banking website to complete the paste function.

However, if the data verification program 110a, 110b determines that the copy field does not match the paste field at 210, then the user is alerted of the mismatch at 214. The data verification program 110a, 110b may determine that the copy field does not match the paste field if the copy tag (e.g., password data) of the copied text is different from the data type (e.g., e-mail data type) of the paste field.

After the data verification program 110a, 110b determines the mismatch, the data verification program 110a, 110b may transmit an alert (e.g., via pop-up message, sound-clip) to the user device to inform the user (e.g., via text in the pop-up message) that the user is attempting to paste the copied text into the wrong paste field. In one embodiment, the data verification program 110a, 110b may also provide the user with an option to abort the paste function (e.g., via "Abort Paste" button in the pop-up message) and an option to complete the paste function (e.g., via "Continue Paste" button in the pop-up message).

In response to detecting a user selection for the option to abort the paste function (e.g., via user clicking the "Abort Paste" button), the data verification program 110a, 110b may transmit a signal (e.g., via communication network 116) to the user device to instruct the user device to abort the paste function. Accordingly, the user device may not paste the copied text from the clipboard 206 into the paste field. Thereafter, the data verification program 110a, 110b may return to 208 to determine the data type of the next paste field.

In response to detecting the user selection for the option to complete the paste function (e.g., via user clicking the "Continue Paste" button), the data verification program 110a, 110b may transmit a signal (e.g., via communication network 116) to the user device to instruct the user device to complete the paste function. Accordingly, the user device may paste the copied text from the clipboard 206 into the paste field. Thereafter, the data verification program 110a, 110b may return to 208 to determine the data type of the next paste field.

Continuing with the previous example, the data verification program 110a, 110b determines that the data type of the paste field in the login page of the banking website is user name data type. Next, the data verification program 110a, 110b communicates, via communication network 116, with the clipboard 206 to identify the copied text "J0hnsP@ssw0rd" that is instructed, via the paste command from the user laptop keyboard, to be entered into the paste field. Then, the data verification program 110a, 110b reads "password data" as the copy tag assigned to the copied text "J0hnsP@ssw0rd" stored in the clipboard 206. Next, the data verification program 110a, 110b compares the copy tag "password data" of the copied text "J0hnsP@ssw0rd" against the user name data type of the paste field and determines a mismatch between the copy field and the paste field.

Accordingly, the data verification program 110a, 110b transmits a pop-up message to the user laptop to alert the user that the user is attempting to paste the copied text (password) into the wrong paste field (user name). The data verification program 110a, 110b provides in the pop-up message, an "Abort Paste" button to enable the user to abort the paste function and a "Continue Paste" button to enable the user to complete the paste function. In response to detecting the user selecting the "Abort Paste" button in the pop-up message, the data verification program 110a, 110b transmits a signal, via communication network 116, to the user laptop to instruct the user laptop to abort the paste function. As such, the user laptop does not paste the copied text "J0hnsP@ssw0rd" from the clipboard 206 into the paste field.

Figure 3:
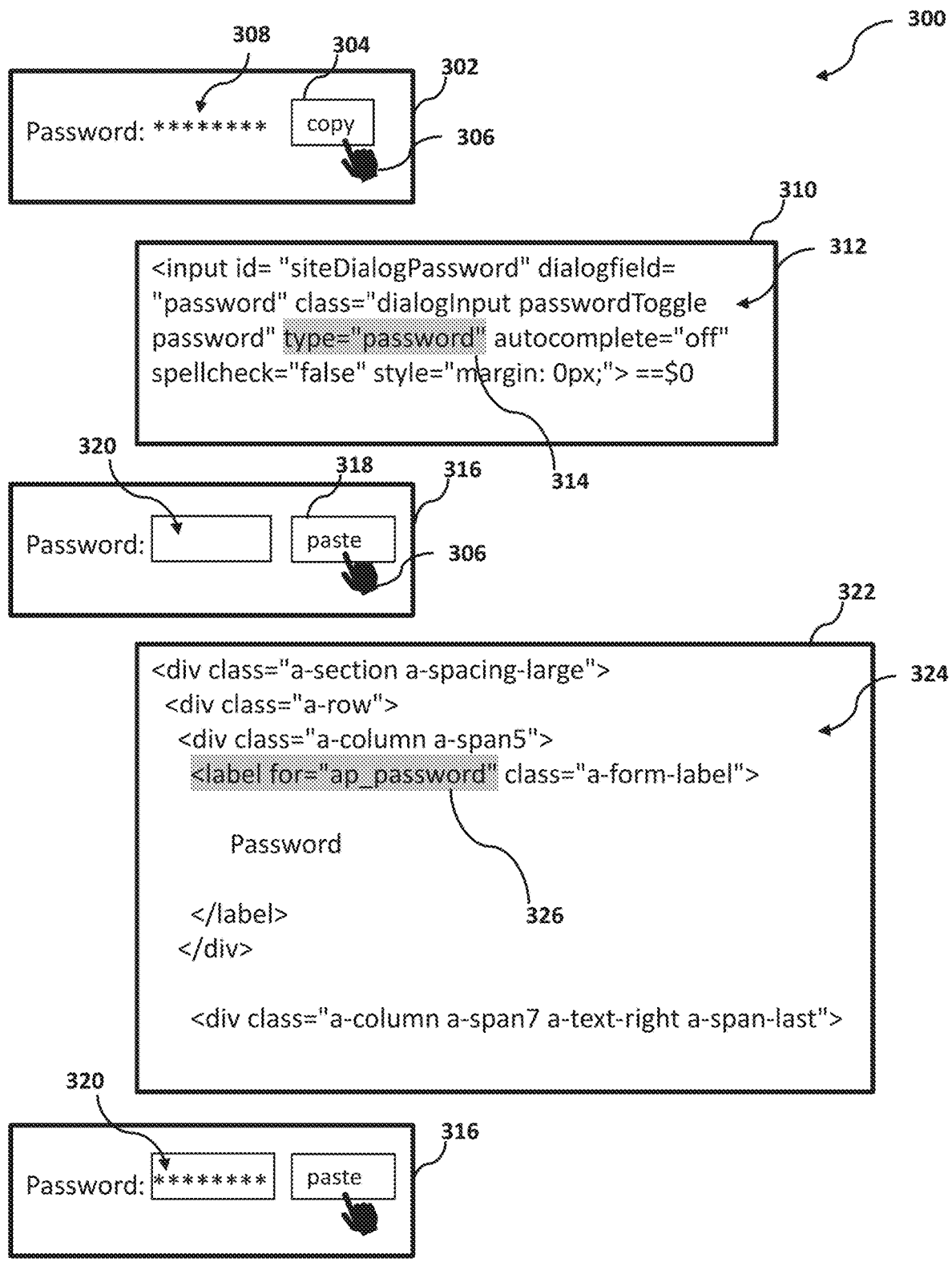
FIG. 3 is a block diagram illustrating a first exemplary data transfer process implemented by a data verification program according to at least one embodiment.

Referring now to FIG. 3, a block diagram illustrating a first exemplary data transfer process 300 implemented by the data verification program 110a, 110b according to at least one embodiment is depicted.

The data verification program 110a, 110b may be implemented as a web browser plug-in on the user device (e.g., client computer 102) as previously described at 202. For example, a user interacts with a web page 302 running on the web browser and enters a copy command (e.g., selects a "copy" button 304 using a pointer 306 of the user device) to instruct the user device to copy a password 308 included in the web page 302. The data verification program 110a, 110b may detect the copy command received to the user device and may be initiated to communicate (via communication network 116) with a web server (e.g., server 112) hosting the web page 302, as previously described at 202. In the communication with the web server, the data verification program 110a, 110b may transmit a request to retrieve the HTML source code associated with the copied password 308. In one embodiment, the request transmitted by the data verification program 110a, 110b may include a targeted request (e.g., indicating the copied password 308) for a code snippet of the HTML source code corresponding to the copied password 308, as previously described at 202. In response, the web server may return to the data verification program 110a, 110b (via communication network 116), a page source 310 for the web page 302, including a localized code snippet 312 of the HTML source code corresponding to the copied password 308, as previously described at 202. The data verification program 110a, 110b may process the localized code snippet 312 and may determine, based on the "password" value in a "type" attribute 314, that a copy field including the copied password 308 is defined by a password data type, as previously described at 202. Accordingly, the data verification program 110a, 110b may store (via communication network 116) "password data" as a copy tag of the copied password 308 stored in the clipboard 206, as previously described at 204.

Then, the user interacts with a web page 316 running on the web browser and enters a paste command (e.g., selects a "paste" button 318 using the pointer 306 of the user device) to instruct the user device to paste the password 308 from the web page 302 to a paste field 320 included in the web page 316. The data verification program 110a, 110b may detect the paste command received by the user device and may be initiated to communicate (via communication network 116) with a web server (e.g., server 112) hosting the web page 316, as previously described at 208. In the communication with the web server, the data verification program 110a, 110b may transmit a request to retrieve the HTML source code associated with the paste field 320. In one embodiment, the request transmitted by the data verification program 110a, 110b may include a targeted request (e.g., indicating the paste field 320) for a code snippet of the HTML source code corresponding to the paste field 320, as previously described at 208. In response, the web server may return to the data verification program 110a, 110b (via communication network 116), a page source 322 for the web page 316, including a localized code snippet 324 of the HTML source code corresponding to the paste field 320, as previously described at 208. The data verification program 110a, 110b may process the localized code snippet 324 and may determine, based on the "ap_password" value in a "for" attribute 326 of a "<label>" element, that the paste field 320 is defined by a password data type, as previously described at 208.

Thereafter, the data verification program 110a, 110b may compare the copy tag "password data" of the copied password 308 stored in the clipboard 206 against the password data type of the paste field 320 and may determine a match between the copy field including the copied password 308 and the paste field 320, as previously described at 210.

Accordingly, the data verification program 110a, 110b may transmit a signal, via communication network 116, to the user device to instruct the user device to complete the paste function. In response, the user device may retrieve the copied password 308 from the clipboard 206 and input the copied password 308 into the paste field 320 in the web page 316 to complete the paste function.

Figure 4:
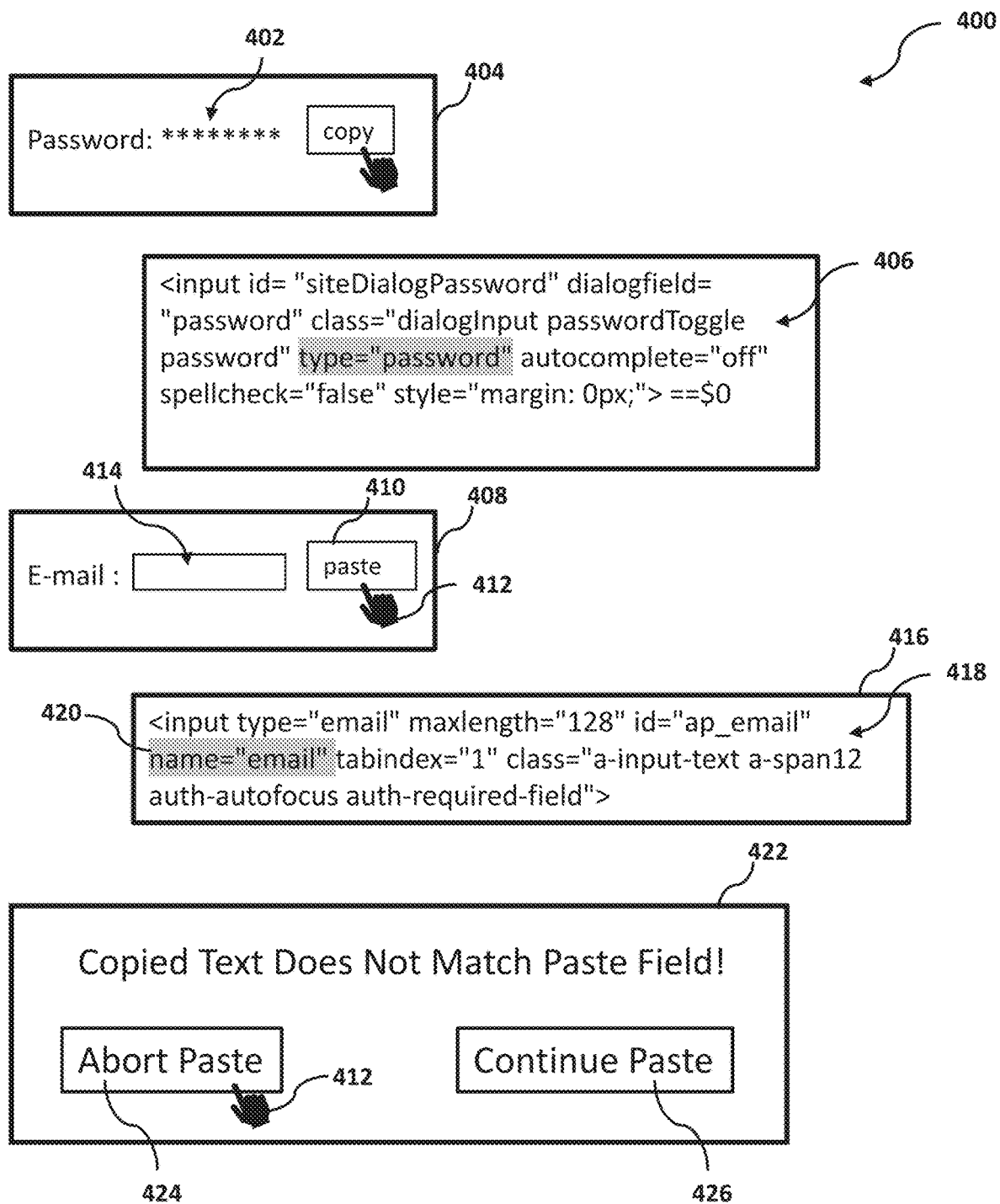
FIG. 4 is a block diagram illustrating a second exemplary data transfer process implemented by a data verification program according to at least one embodiment.

Referring now to FIG. 4, a block diagram illustrating a second exemplary data transfer process 400 implemented by the data verification program 110a, 110b according to at least one embodiment is depicted.

The exemplary data transfer process 400 depicted in FIG. 4 continues from the copying function described with reference to FIG. 3. As such, the user instructs the user device to copy a password 402 included in a web page 404. The data verification program 110a, 110b may process a localized code snippet 406 corresponding to the copied password 402 and may determine that a copy field including the copied password 402 is defined by a password data type, as previously described at 202. Accordingly, the data verification program 110a, 110b may store (via communication network 116) "password data" as a copy tag of the copied password 402 stored in the clipboard 206, as previously described at 204.

Then, the user interacts with a web page 408 running on the web browser and enters a paste command (e.g., selects a "paste" button 410 using the pointer 412 of the user device) to instruct the user device to paste the copied password 402 from the web page 404 to a paste field 414 included in the web page 408. The data verification program 110a, 110b may detect the paste command received by the user device and may be initiated to communicate (via communication network 116) with a web server (e.g., server 112) hosting the web page 408, as previously described at 208. In the communication with the web server, the data verification program 110a, 110b may transmit a request to retrieve the HTML source code associated with the paste field 414. In one embodiment, the request transmitted by the data verification program 110a, 110b may include a targeted request (e.g., indicating the paste field 414) for a code snippet of the HTML source code corresponding to the paste field 414, as previously described at 208. In response, the web server may return to the data verification program 110a, 110b (via communication network 116), a page source 416 for the web page 408, including a localized code snippet 418 of the HTML source code corresponding to the paste field 414, as previously described at 208. The data verification program 110a, 110b may process the localized code snippet 418 and may determine, based on the "email" value in a "name" attribute 420 of an "<input>" element, that the paste field 414 is defined by an e-mail data type, as previously described at 208.

Thereafter, the data verification program 110a, 110b may compare the copy tag "password data" of the copied password 402 stored in the clipboard 206 against the e-mail data type of the paste field 414 and may determine a mismatch between the copy field including the copied password 402 and the paste field 414, as previously described at 210.

Accordingly, the data verification program 110a, 110b may transmit an alert 422 to the user device to notify the user of an attempt to paste a password (copied password 402) into an e-mail field (paste field 414). The data verification program 110a, 110b may provide in the alert 422, an "Abort Paste" button 424 to prompt or enable the user to abort the paste function and a "Continue Paste" button 426 to prompt or enable the user to complete the paste function. For example, the user selects the "Abort Paste" button 424 using pointer 412 of the user device. In response to detecting the user selecting the "Abort Paste" button 424 in the alert 422, the data verification program 110*a*, 110*b* may transmit a signal, via communication network 116, to the user device to instruct the user device to abort the paste function. As such, the user device may not paste the copied password 402 from the clipboard 206 into the paste field 414 of the web page 408.

The functionality of a computer may be improved by the data verification program 110*a*, 110*b* because the data verification program 110*a*, 110*b* may provide security for potentially sensitive data received from a user. As described herein, the data verification program 110*a*, 110*b* may provide pre-transfer verification when a detected sensitive data is transferred from a source location to a destination location. The data verification program 110*a*, 110*b* may have the capacity to improve the technical field of data security by performing a pre-transfer determination of a copy field and a paste field in order to verify that a copied data included in the copy field is pasted into a paste field that shares a same data type (e.g., password data). Thus, the data verification program 110*a*, 110*b* may improve the efficiency with which a computer may provide security for data transferred from the copy field to the paste field. Specifically, the data verification program 110*a*, 110*b* may inspect a source code corresponding to the copy field including the copied data (e.g., copied text) and may inspect a source code corresponding to the paste field intended for receiving the copied data. Then, the data verification program 110*a*, 110*b* may determine a data type of the copy field and a data type of the paste field based on one or more tags, attributes, and elements included the respective source codes associated with the copied data and the paste field. Next, the data verification program 110*a*, 110*b* may compare the copy field and the paste field. Thereafter, if a mismatch is detected between the data type of the copy field and the data type of the paste field, the data verification program 110*a*, 110*b* may alert the user about pasting potentially sensitive data in a wrong paste field. As such, the data verification program 110*a*, 110*b* may improve the functionality of a computer by preventing a potential computer security breach resulting from transferring potentially sensitive data into an unintended paste field.

It may be appreciated that FIGS. 2 to 4 provide only an illustration of one embodiment and do not imply any limitations with regard to how different embodiments may be implemented. Many modifications to the depicted embodiment(s) may be made based on design and implementation requirements.

Figure 5:
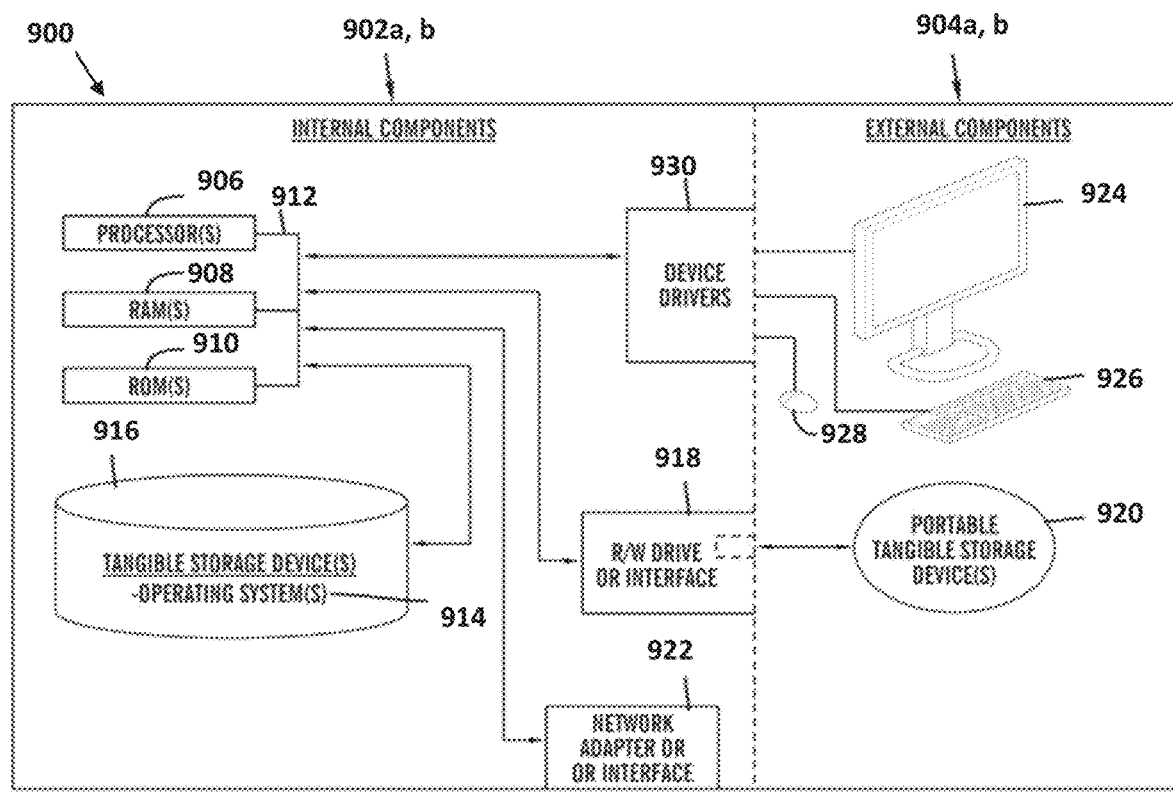
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 5. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the data verification program 110*a* in client computer 102, and the data verification program 110*b* in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the data verification program 110*a* and 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the data verification program 110*a* in client computer 102 and the data verification program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the data verification program 110*a* in client computer 102 and the data verification program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
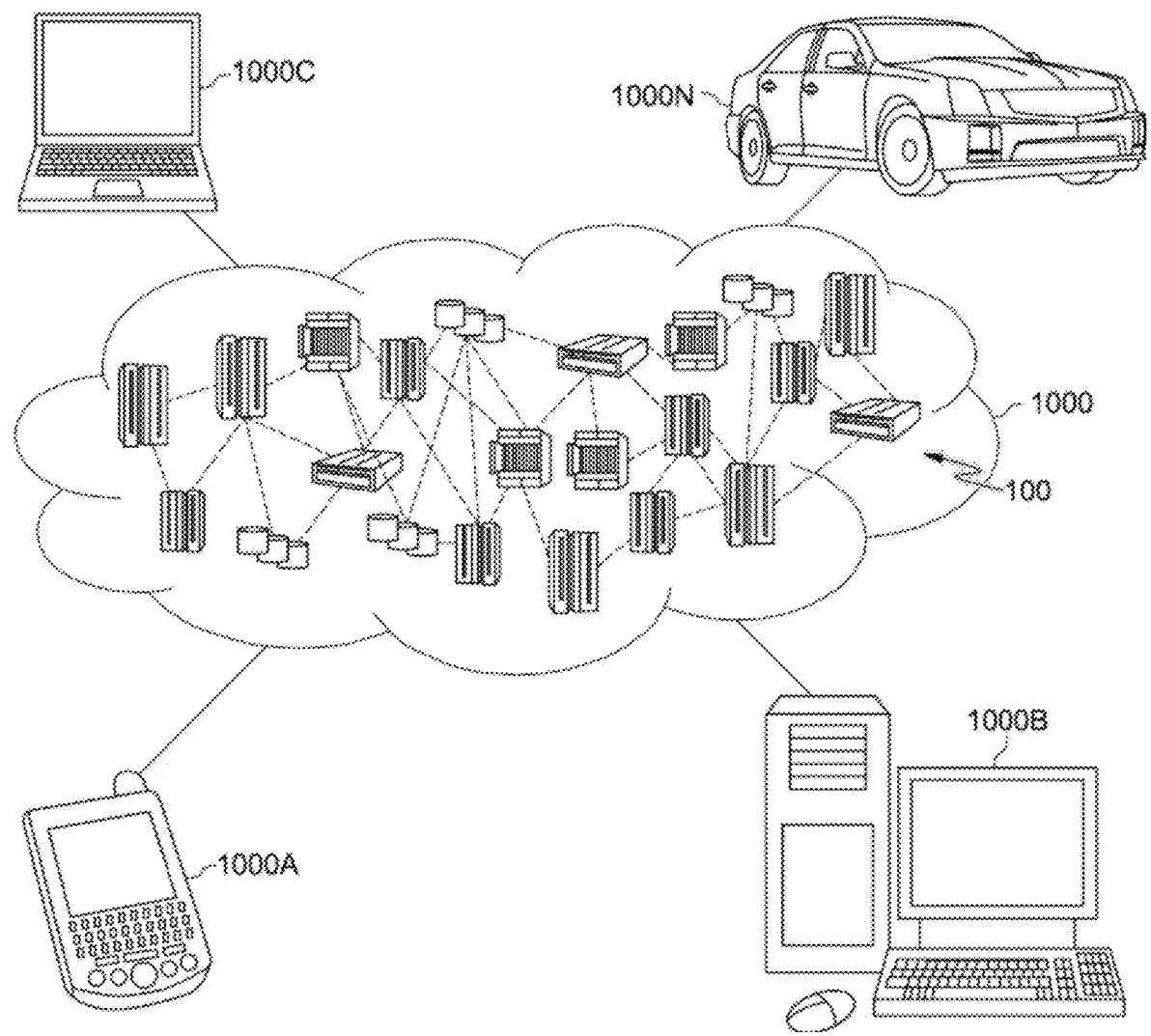
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
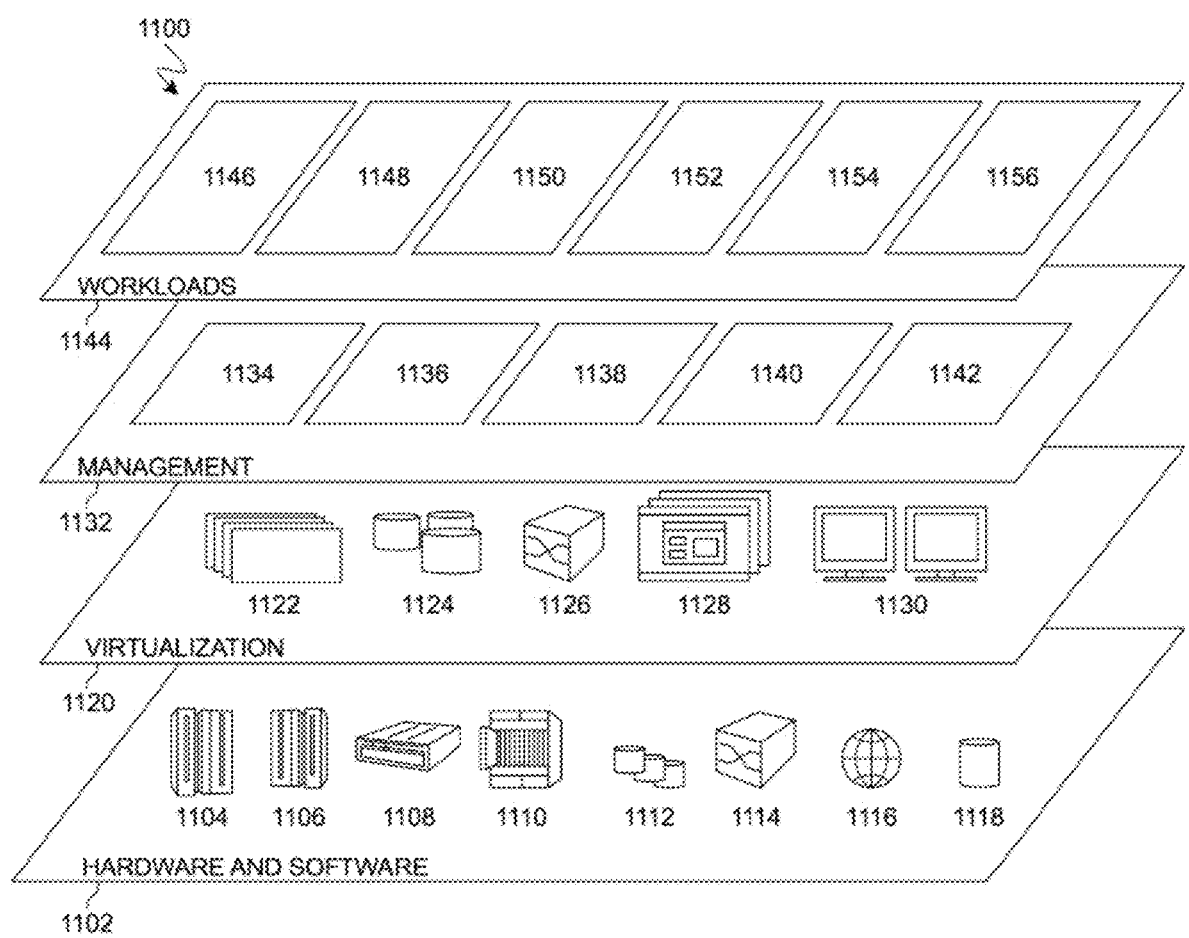
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data verification 1156. A data verification program 110*a*, 110*b* provides a way to perform a pre-transfer determination of a copy field and a paste field in order to verify that a copied data included in the copy field is pasted into a matching paste field and to prevent transferring potentially sensitive data into an unintended paste field.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for verified data transfer, the method comprising:
   determining a first data type of a copy field including a copied data;
   determining a second data type of a paste field intended for receiving the copied data;
   identifying a data type mismatch between the first determined data type of the copy field including the copied data and the second determined data type of the paste field; and
   preventing an input of the copied data into the paste field responsive to the identified data type mismatch between the first determined data type of the copy field including the copied data and the second determined data type of the paste field;
   generating a textual alert including a message indicating the identified data type mismatch between the first determined data type of the copy field and the second determined data type of the paste field; and
   prompting, in the generated textual alert, a selection between a first confirmation and a second confirmation, wherein the selection of the first confirmation aborts the input of the copied data into the paste field and wherein the selection of the second confirmation continues the input of the copied data into the paste field.

2. The method of claim 1, further comprising:
   in response to identifying a match between the first determined data type of the copy field including the copied data and the second determined data type of the paste field intended to receive the copied data, transmitting a signal to a user device to enable the input of the copied data into the paste field from a clipboard of the user device.

3. The method of claim 1, further comprising:
   in response to detecting a copy command to a user device, retrieving a first Hypertext Markup Language (HTML) source code associated with the copy field including the copied data;
   in response to detecting a paste command to the user device, retrieving a second HTML source code associated with the paste field intended to receive the copied data; and
   determining a match between the copy field and the paste field based on a comparison between a copy field value identified in the first retrieved HTML source code associated with the copy field and a paste field value identified in the second retrieved HTML source code associated with the paste field.

4. The method of claim 1, further comprising:
   in response to detecting the copied data, processing a first code snippet corresponding to the copy field including the copied data; and
   defining the first determined data type of the copy field including the copied data based on a copy field value identified in the first processed code snippet.

5. The method of claim 4, further comprising:
   assigning a copy tag to the copied data based on the first defined data type of the copy field including the copied data; and
   recording the assigned copy tag in a clipboard of a user device storing the copied data.

6. The method of claim 5, further comprising:
   in response to detecting a paste command received to a user device, processing a second code snippet corresponding to the paste field intended to receive the copied data; and
   defining the second determined data type of the paste field intended to receive the copied data based on a paste field value identified in the second processed code snippet.

7. A computer system for verified data transfer, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

determining a first data type of a copy field including a copied data;

determining a second data type of a paste field intended for receiving the copied data;

identifying a data type mismatch between the first determined data type of the copy field including the copied data and the second determined data type of the paste field; and preventing an input of the copied data into the paste field responsive to the identified data type mismatch between the first determined data type of the copy field including the copied data and the second determined data type of the paste field;

generating a textual alert including a message indicating the identified data type mismatch between the first determined data type of the copy field and the second determined data type of the paste field; and prompting, in the generated textual alert, a selection between a first confirmation and a second confirmation, wherein the selection of the first confirmation aborts the input of the copied data into the paste field and wherein the selection of the second confirmation continues the input of the copied data into the paste field.

8. The computer system of claim 7, further comprising:

in response to identifying a match between the first determined data type of the copy field including the copied data and the second determined data type of the paste field intended to receive the copied data, transmitting a signal to a user device to enable the input of the copied data into the paste field from a clipboard of the user device.

9. The computer system of claim 7, further comprising:

in response to detecting a copy command to a user device, retrieving a first Hypertext Markup Language (HTML) source code associated with the copy field including the copied data;

in response to detecting a paste command to the user device, retrieving a second HTML source code associated with the paste field intended to receive the copied data; and determining a match between the copy field and the paste field based on a comparison between a copy field value identified in the first retrieved HTML source code associated with the copy field and a paste field value identified in the second retrieved HTML source code associated with the paste field.

10. The computer system of claim 7, further comprising:

in response to detecting the copied data, processing a first code snippet corresponding to the copy field including the copied data; and defining the first determined data type of the copy field including the copied data based on a copy field value identified in the first processed code snippet.

11. The computer system of claim 10, further comprising:

assigning a copy tag to the copied data based on the first defined data type of the copy field including the copied data; and recording the assigned copy tag in a clipboard of a user device storing the copied data.

12. The computer system of claim 11, further comprising:

in response to detecting a paste command received to a user device, processing a second code snippet corresponding to the paste field intended to receive the copied data; and defining the second determined data type of the paste field intended to receive the copied data based on a paste field value identified in the second processed code snippet.

13. A computer program product for verified data transfer, comprising:

one or more computer-readable tangible storage media and program instructions stored on at least one of the one or more computer-readable tangible storage media, the program instructions executable by a processor to cause the processor to perform a method comprising:

determining a first data type of a copy field including a copied data;

determining a second data type of a paste field intended for receiving the copied data;

identifying a data type mismatch between the first determined data type of the copy field including the copied data and the second determined data type of the paste field; and preventing an input of the copied data into the paste field responsive to the identified data type mismatch between the first determined data type of the copy field including the copied data and the second determined data type of the paste field;

generating a textual alert including a message indicating the identified data type mismatch between the first determined data type of the copy field and the second determined data type of the paste field; and prompting, in the generated textual alert, a selection between a first confirmation and a second confirmation, wherein the selection of the first confirmation aborts the input of the copied data into the paste field and wherein the selection of the second confirmation continues the input of the copied data into the paste field.

14. The computer program product of claim 13, further comprising:

in response to identifying a match between the first determined data type of the copy field including the copied data and the second determined data type of the paste field intended to receive the copied data, transmitting a signal to a user device to enable the input of the copied data into the paste field from a clipboard of the user device.

15. The computer program product of claim 13, further comprising:

in response to detecting a copy command to a user device, retrieving a first Hypertext Markup Language (HTML) source code associated with the copy field including the copied data;

in response to detecting a paste command to the user device, retrieving a second HTML source code associated with the paste field intended to receive the copied data; and determining a match between the copy field and the paste field based on a comparison between a copy field value identified in the first retrieved HTML source code associated with the copy field and a paste field value identified in the second retrieved HTML source code associated with the paste field.

16. The computer program product of claim 13, further comprising:

in response to detecting the copied data, processing a first code snippet corresponding to the copy field including the copied data; and defining the first determined data type of the copy field including the copied data based on a copy field value identified in the first processed code snippet.

17. The computer program product of claim 16, further comprising:
    assigning a copy tag to the copied data based on the first defined data type of the copy field including the copied data; and
    recording the assigned copy tag in a clipboard of a user device storing the copied data.

\* \* \* \* \*